United States Patent [19]
Komoriya et al.

[11] Patent Number: 5,505,174
[45] Date of Patent: Apr. 9, 1996

[54] EGR RATE ESTIMATION SYSTEM FOR INTERNAL COMBUSTION ENGINE

[75] Inventors: Isao Komoriya; Yusuke Hasegawa; Hidetaka Maki; Shusuke Akazaki; Hiroshi Kitagawa; Toru Kitamura, all of Wako, Japan

[73] Assignee: Honda Giken Kogyo Kabushiki Kaisha, Tokyo, Japan

[21] Appl. No.: 421,181

[22] Filed: Apr. 13, 1995

[30] Foreign Application Priority Data

Apr. 14, 1994 [JP] Japan ................................. 6-100557
Nov. 2, 1994 [JP] Japan ................................. 6-294014

[51] Int. Cl.⁶ ........................ F02D 41/04; F02M 25/07; F02P 5/15
[52] U.S. Cl. ........................ 123/417; 123/478; 123/571
[58] Field of Search .................... 123/416, 417, 123/478, 480, 494, 571; 364/431.06; 73/117.3, 118.2

[56] References Cited

U.S. PATENT DOCUMENTS

| | | | |
|---|---|---|---|
| 4,060,065 | 11/1977 | Hata et al. | 123/571 |
| 4,473,056 | 9/1984 | Ishida et al. | 123/571 |
| 4,548,185 | 10/1985 | Pozniak | 123/571 |
| 4,640,257 | 2/1987 | Kodama et al. | 364/431.06 |
| 4,782,810 | 11/1988 | Shimoda et al. | 123/571 |
| 5,205,260 | 4/1993 | Takahashi et al. | 123/571 |
| 5,215,061 | 6/1993 | Ogawa et al. | 123/478 |
| 5,261,370 | 11/1993 | Ogawa et al. | 123/571 |
| 5,273,019 | 12/1993 | Mattews et al. | 123/571 |

FOREIGN PATENT DOCUMENTS

| | | |
|---|---|---|
| 59-192838 | 11/1984 | Japan . |
| 60-169641 | 9/1985 | Japan . |
| 4-311643 | 11/1992 | Japan . |
| 5-118239 | 5/1993 | Japan . |
| 7-127494 | 5/1995 | Japan . |

*Primary Examiner*—Willis R. Wolfe
*Attorney, Agent, or Firm*—Nikaido, Marmelstein, Murray & Oram

[57] ABSTRACT

A system for estimating an exhaust gas recirculation rate for an internal combustion engine. In the system, the EGR rate when its operation is steady is first determined to a desired value with respect to the engine operating conditions at least including the engine speed and the engine load, then the EGR rate is estimated as;

EGR rate=(steady-state EGR rate)×{(gas flow rate QACT determined by the actual valve lifting amount and the ratio between the upstream pressure and the downstream pressure of valve)/(gas flow rate QCMD determined by a command value and the ratio between the upstream pressure and the downstream pressure of valve)} A delay time until the recycled gas enters the combustion chamber is determined and one from among the EGR rates or a fuel injection correction coefficients calculated therefrom consecutively is selected.

28 Claims, 14 Drawing Sheets

FIG.4

|    | PBA |     |     |     |
|----|-----|-----|-----|-----|
| NE |     | KEGRMAP |     |     |

FIG.5

|    | PBA |     |     |     |
|----|-----|-----|-----|-----|
| NE |     | LCMD |     |     |

FIG. 11

KEGRN

| Current value | NO |
|---|---|
|  | 0 |
| 1 TDC earlier | 1 |
| 2 TDCs earlier | 2 |
| 3 TDCs earlier | 3 |
| 4 // | 4 |
| 5 // | 5 |
| 6 // | 6 |
| 7 // | 7 |
| 8 // | 8 |
| 9 // | 9 |
| 10 // | 10 |
| 11 // | 11 |
| 12 // | 12 |
| ⋮ | ⋮ |
| n | n |

FIG. 12

| NE | PBA |  |  |  |  |
|---|---|---|---|---|---|
|  |  |  |  |  |  |
|  |  |  |  |  |  |
|  |  |  | τ |  |  |
|  |  |  |  |  |  |
|  |  |  |  |  |  |

EGR RATE ESTIMATION SYSTEM FOR INTERNAL COMBUSTION ENGINE

BACKGROUND OF THE INVENTION

1. Field of the Invention

This invention relates to an EGR (exhaust gas recirculation) rate estimation system for an internal combustion engine, and more particularly to a system for estimating a rate of recirculated exhaust gas that enters the combustion chamber in the intake air supplied to the engine.

2. Description of the Prior Art

It is known in automotive engineering to connect the intake system and the exhaust system of an engine for recycling a portion of the exhaust gases to the intake system in order to reduce the formation of nitrogen oxides (NOx) and at the same time, to enhance fuel economy. The passage connecting the exhaust system to the intake system is provided with a valve for regulating the amount or flow rate of recirculated exhaust gas. The valve is hereinafter referred to as the "EGR control valve". In order to control the amount or flow rate of exhaust gas to be recirculated, a command value for the EGR control valve lifting amount is determined based on engine operating parameters at least including engine speed and engine load. In the vacuum-operated EGR control valve, the negative pressure in the intake system is introduced and exerts a negative pressure on the valve to open it in response to the command value, whereas the valve is operated to open via a motor when the valve is of the power-operated type. Here, the term "lifting" or "lift" is used to mean the opening area of the EGR control valve.

As illustrated in FIG. 18, the actual behavior of the EGR control valve lags behind the time that the command value is issued. Namely, there is a response delay between the actual valve lifting and the command value to do so. The lag time is constant in the motor-operated valve, but varies with engine operating conditions in the vacuum-operated valve. Moreover, it takes additional time for the exhaust gas passing through the valve to enter the combustion chamber. Therefore, in order to carry out EGR control properly, it becomes necessary to estimate accurately the amount or flow rate of the recirculated exhaust gas. The amount or flow rate of recirculated exhaust gas is generally estimated as a rate in the mass or volume of intake air or mixture. The rate is referred to as "EGR rate" or "exhaust gas recirculation rate" in the specification, which will be explained in detail later.

Moreover, since the recycled exhaust gas becomes a disturbance in the fuel metering or air/fuel ratio control in an engine, it is proposed in Japanese Laid-open Patent Application Sho 60(1985)-169,641 to determine a fuel injection correction coefficient in response to the EGR rate and to correct the fuel injection amount in a decreasing direction. The prior art system takes into account the fact that the lag time varies with the engine operating conditions in the vacuum-operated EGR control valve, and it delays switching the correction coefficient for a period determined by the engine operating conditions. Another reference, Japanese Laid-open Patent Application Sho 59(1984)-192,838 teaches to change the value of a fuel injection correction coefficient gradually.

Since, however, the behavior of the exhaust gas is more complicated, the assignee proposed earlier in Japanese Laid-open Patent Application Hei 5(1993)-118,239 (filed in the United States and patented under the number of U.S. Pat. No. 5,215,061) to establish a model describing the behavior of the exhaust gas. In this earlier proposed system, the exhaust gas behavior caused by valve lifting is expressed by an equation and the net EGR rate is determined by this equation. Specifically, the earlier system used a concept of two kinds of ratios named "direct ratio" and "carry-off ratio". The first ratio corresponds to a fraction, to the exhaust gases passing through the EGR control valve during the control cycle n, of the exhaust gas that enters the combustion chamber during the cycle n, while the second ratio corresponds to a fraction, to the exhaust gases which passed through the valve by a time m cycles earlier ($m \geq 1$), but that remained in a space before the combustion chamber, of the exhaust gas that enters the combustion chamber during the cycle n. The earlier system estimates the net EGR rate by the direct ratio and the carry-off ratio.

In addition, the assignee proposed in Japanese Patent Application No. Hei 5(1993)-296,049 (filed in the United States on Oct. 31, 1994 under the number of 08/331746 still pending) another system to estimate the net EGR rate in such a manner that:

Net EGR rate=EGR rate at a steady-state×(Actual valve lifting amount/Command value for valve lifting amount)

The system configuration is less complicated than that proposed in the publication 5-118,239, since the net EGR rate is estimated from the ratio between the command value and the actual value of valve lifting. (In order to distinguish the EGR rate at a steady-state, the EGR rate is sometimes referred to as the "net" EGR rate.)

However, the amount or flow rate of recirculated exhaust gas depends not only on the amount of valve lifting (the opening area of the valve), but also on engine operating conditions. In other words, the amount or flow rate of recirculated exhaust gas varies with the engine operating conditions even when the amount of valve lifting remains unchanged. The estimation accuracy of the system is therefore not always satisfactory. As a result, the correction coefficient for the fuel metering or air/fuel ratio control calculated on the basis of the estimated net EGR rate is not always proper.

Furthermore, Japanese Laid-open Patent Application No. Hei 4(1992)-311,643 discloses a system for estimating the partial pressures of air and exhaust gas in the intake pipe respectively and based on the estimated values and additionally on the engine speed, to calculate the amount of air entering the combustion chamber. The prior art system needs, however, to determine the amount of exhaust gas recycled in the intake pipe as well as the intake air temperature and the volume of a space (the so-called "chamber") before the combustion chamber and hence requires complicated calculations. It is quite difficult to accurately measure the recycled exhaust gas flow rate due to the delay in the recycled exhaust gas etc. and the calculations are subject to uncertainties.

A first object of the invention is therefore to provide an EGR rate estimation system for an internal combustion engine which is simple in configuration without requiring complicated calculation, but that is able to estimate the exhaust gas recirculate rate with high accuracy, while reducing calculation uncertainties as much as possible.

As mentioned above, the recirculated exhaust gas will be a disturbance for carrying out the fuel metering or air/fuel ratio control in an engine.

A second object of the invention is therefore to provide an EGR rate estimation system for an internal combustion engine which enables to estimate the exhaust gas reticulation rate with high accuracy, thereby enhancing the accuracy of the fuel metering or air/fuel ratio control in an engine.

Moreover, when a command value for valve lifting amount is made zero to discontinue the EGR operation, the amount of actual valve lifting does not immediately decrease to zero due to a response delay in the operation of the EGR control valve. The exhaust gas continues to pass through the valve all the while, although the amount or flow rate of exhaust gas passing therethrough is quite small. In addition, when a command value for valve lifting amount becomes zero, there may arise a problem which could make the EGR rate estimation difficult.

A third object of the invention is therefore to provide an EGR rate estimation system for an internal combustion engine which is able to estimate the exhaust gas recirculation rate correctly, accounting for the delay in the valve operation and without causing any difficulty in the estimation when a command value for valve lifting amount is made zero.

Apart from the above, some engines have a recirculation passage connecting the exhaust system to the intake system at a position relatively farther from the combustion chamber such that a transport delay of the recycled exhaust gas could occur. The transport delay affects the EGR rate estimation.

A fourth object of the invention is therefore to provide an EGR rate estimation system for an internal combustion engine which can estimate the exhaust gas recirculation rate accurately when the exhaust gas transport delay could occur.

As mentioned repeatedly, the recirculated exhaust gas will be a disturbance for carrying out the fuel metering or air/fuel ratio control and the transport delay could degrade the accuracy of such control.

A fifth object of the invention is therefore to provide an EGR rate estimation system for an internal combustion engine which can estimate the exhaust gas recirculation rate when the transport delay could occur, thereby enhancing the accuracy of the fuel metering or air/fuel ratio control in an engine.

Aside from the above, the recycled exhaust gas will degrade the ignitability of the mixture in the combustion chamber. Thus, the recycled exhaust gas not only affects the fuel metering or air/fuel ratio control, but also affects the ignition timing control in an engine.

A sixth object of the invention is therefore to provide an EGR rate estimation system for an internal combustion engine which can estimate the exhaust gas recirculation rate accurately, thereby enabling the ignition timing under EGR operation to be determined properly.

SUMMARY OF THE INVENTION

This invention achieves these objects by providing a system for estimating an exhaust gas recirculation rate for an internal combustion engine, said engine having a passage connecting an exhaust pipe to an intake pipe for recirculating a portion of exhaust gases in said exhaust pipe to a combustion chamber through said intake pipe, and a valve provided at said passage for regulating an amount or a flow rate of said exhaust gas to be recirculated in response to a command value for valve lift amount, comprising engine operating condition detecting means for detecting operating conditions of said engine at least including engine speed and engine load, basic exhaust gas recirculation rate determining means for determining a basic exhaust gas recirculation rate (1-KEGRMAP) at least based on said detected engine speed and engine load, first flow rate estimating means for estimating a first flow rate QACT of said exhaust gas passing through said valve based on flow rate characteristics of said valve including a valve lifting amount LACT, and second flow rate estimating means for estimating a second flow rate QCMD of said exhaust gas to be recirculated passing through said valve based on flow rate characteristics of said valve including said command value for valve lifting amount LCMD, net exhaust gas recirculation rate estimating means for estimating a net exhaust gas recirculation rate based on said basic exhaust gas recirculation rate (1-KEGRMAP), said first flow rate QACT and said second flow rate QCMD.

BRIEF EXPLANATION OF THE DRAWINGS

These and other objects and advantages of the invention will be more apparent from the following description and drawings, in which:

FIG. 4 is an explanatory view showing the characteristics of mapped data of a coefficient KEGRMAP;

FIG. 5 is an explanatory view showing the characteristics of mapped data of a command value for valve lifting amount LCMD;

FIG. 11 is an explanatory view showing the configuration of a ring buffer used in the flowchart of FIG. 10;

FIG. 12 is an explanatory view showing the characteristics of mapped data of a delay time $\tau$ used in the flowchart of FIG. 10;

DETAILED DESCRIPTION OF PREFERRED EMBODIMENTS

Embodiments of the invention will now be explained with reference to the drawings.

Figure 1:
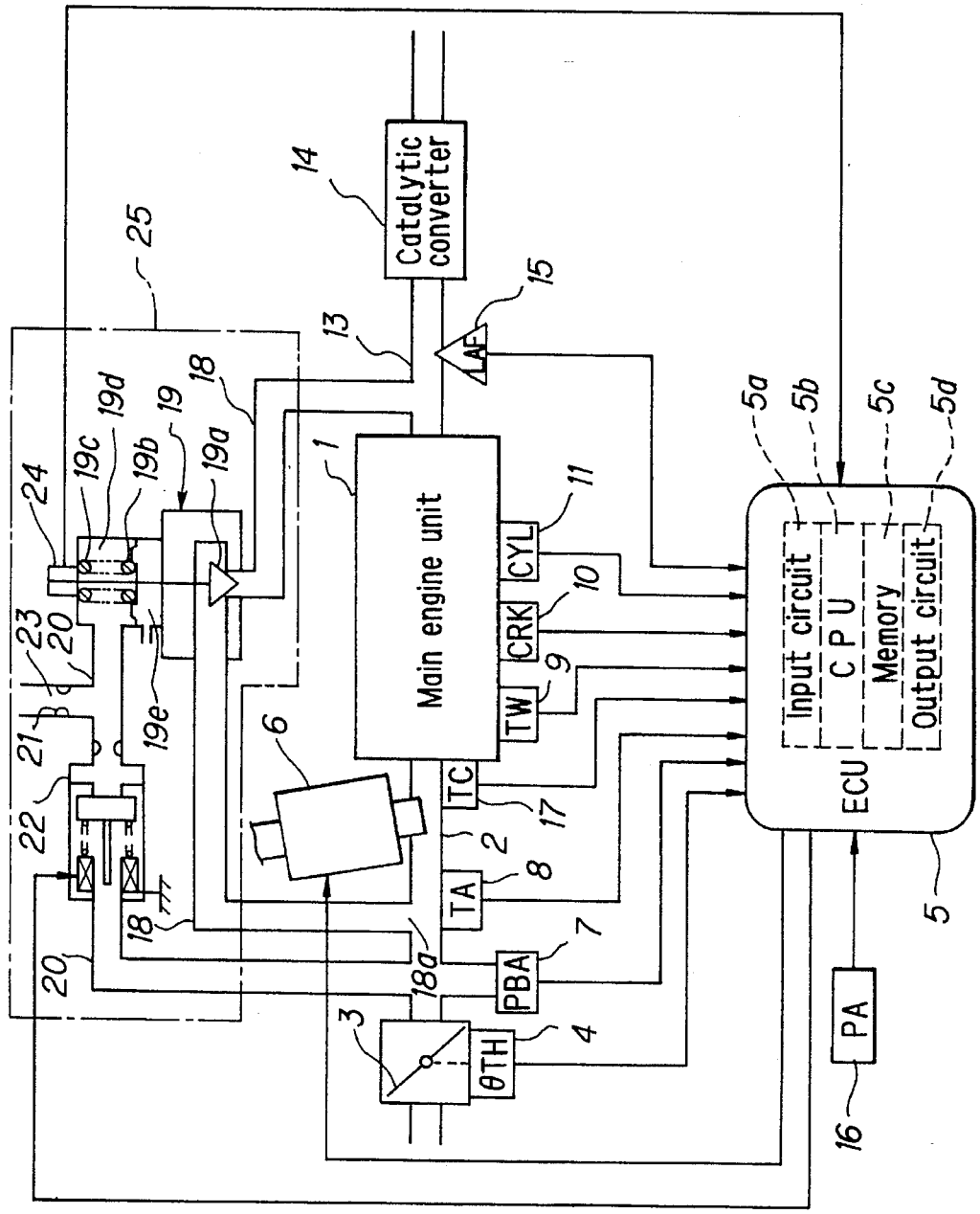
FIG. 1 is a schematic view showing the overall arrangement of an EGR rate estimation system for an internal combustion engine according to the invention.

FIG. 1 shows the overall arrangement of the EGR rate estimation system for an internal combustion engine according to the invention.

In the figure the engine is a four cylinder engine and main engine unit 1 of the engine is provided with an air intake pipe 2 which has a throttle valve 3 at an appropriate location therewith. The throttle valve 3 is connected with a throttle position sensor 4 (illustrated as "θTH" in the figure) which generates an output indicative of the position (opening degree) of the throttle valve 3 and sends it to an electronic control unit 5 (illustrated and will be hereinafter referred to as "ECU").

The ECU 5 is comprised of a microcomputer made up of an input circuit 5a, a central processing unit 5b, a memory 5c, and an output circuit 5d. The input circuit 5a receives the output of the throttle position sensor 4 and other outputs of some similar sensors explained later, shapes wave forms of the outputs, converts the voltage levels of the outputs to predetermined levels, and converts a digital value into an analog value, if necessary. The central processing unit (CPU) 5b carries out various calculations for the EGR rate estimation, fuel metering control and some similar operations as will be explained later in accordance with programs stored in the memory 5c. The CPU 5b also determines and outputs manipulated variables to devices concerned through the output circuit 5d.

Each cylinder has a fuel injection valve 6 for injecting fuel in the combustion chamber (not shown) installed in the vicinity of an intake port (not shown) of the combustion chamber. The fuel injection valve 6 is connected with a fuel pump (not shown) to be supplied with fuel and is, on the other hand, electrically connected with the ECU 5 to be regulated in its opening period, thereby defining the fuel injection amount. The intake pipe 2 is provided with a manifold absolute pressure sensor 7 (illustrated as "PBA") downstream of the throttle valve 3 which generates an output indicative of the manifold absolute pressure PBA and an intake air temperature sensor (illustrated as "TA") farther downstream of the manifold absolute pressure sensor 7 which generates an output indicative of the intake air temperature TA. These outputs are outputted to the ECU 5.

Moreover, the main engine unit 1 is equipped with an engine coolant temperature sensor 9 (illustrated as "TW") which generates and sends to the ECU 5 an output indicative of the coolant water temperature TW. In addition, the main engine unit 1 is provided at its crank shaft or cam shaft (neither shown) with a crankshaft sensor 10 (illustrated as "CRK") which generates an output at every predetermined crank angular positions including piston top dead center (TDC) position, and a reference cylinder position sensor 11 (illustrated as "CYL") which generates an output indicative of a predetermined crank angular position CYL of a selected cylinder from among the four cylinders. These sensor outputs are also sent to the ECU and the output CRK is counted by a counter (not shown) to detect the engine speed NE.

The main engine unit 1 has an exhaust pipe 13 and a catalytic converter 14 is provided at an appropriate location therewith to decrease HC and CO emissions and NOx emissions, or all three of these exhaust pollutants. In the exhaust pipe 13, an air/fuel ratio sensor 15 (illustrated as "LAF") is installed upstream of the catalytic converter 14 and generates an output indicative of the oxygen concentration in the exhaust gas. The output is forwarded to the ECU 5 and is input in a circuit (not shown) where it is subjected to appropriate linear processing to obtain an air/fuel ratio which varies linearly with the oxygen concentration of the exhaust gas over a broad range extending from the lean direction to the rich direction.

Furthermore, an atmospheric pressure sensor 16 (illustrated as "PA") is installed in the vicinity of the main engine unit 1 and generates an output indicative of the atmospheric pressure PA at the place where the engine is located. And a third temperature sensor 17 (illustrated as "TC") is provided on the floor of the intake pipe 2 in the vicinity of the intake port and generates an output indicative of the intake pipe floor temperature TC. These sensor outputs are sent to the ECU 5.

Here, the engine is equipped with an EGR system 25. This will be explained next.

The EGR system 25 has an EGR passage 18 which extends from the exhaust pipe 13 to the intake pipe 2 and is connected thereto at a position 18a. Here, it is assumed that the distance between the position 18a and the combustion chamber is relatively short and hence, it is not necessary to take the transport delay of the recirculated exhaust gas into account.

A vacuum-operated EGR control valve 19 is provided in the passage 18 at an appropriate location therewith. The EGR control valve 19 is generally comprised of a valve member 19a for opening/closing the passage 18, a diaphragm 19b connecting with the valve member 19a and a spring 19c urging the diaphragm 19b and the valve member 19a in the closing direction (downward in the figure).

The diaphragm 19b separates the inside of the valve 19 into two chambers 19d and 19e. The chamber 19d is connected with the intake pipe 2 via a conduit 20 and receives the negative pressure therefrom. The conduit 20 has a solenoid valve 22 of the normally-closed type which regulates the negative pressure to be introduced in the chamber 19d. The conduit 20 has a second conduit 23 which is branched off at downstream of the solenoid 22 and is opened to the ambient atmosphere so that air is introduced to the conduit 20 via an orifice provided at the second conduit 23 and then to the chamber 19d. The other chamber 19e in the valve 19 is opened to the ambient atmosphere. Thus, when the negative pressure regulated by the solenoid valve 22 is applied to the chamber 19d, the valve member 19a is lifted in the opening direction (upward in the figure) and exhaust gas will be introduced to the intake pipe 2 by an amount corresponding to the amount of valve lifting.

It should be noted here that the opening area of the EGR control valve 19 is determined in terms of the amount of valve lifting, since the amount of lifting in the EGR control valve used here is proportional to its opening area. Accordingly when a different valve such as a linear solenoid is used, another parameter will be used to determine the opening area.

The solenoid valve 22 is electrically connected with the ECU 5 and receives a command value that corresponds to the amount of lifting (opening) of the EGR control valve 19. A sensor 24 is installed at the EGR control valve 19 and generates an output indicative of the amount of stroke of the valve member 19a, i.e., the actual amount of valve lifting and sends it to the ECU 5.

Based on the detected parameters, the CPU 5b in the ECU 5 determines a fuel injection amount in terms of the opening period of the injection valve 6 and ignition timing for the ignition system (not shown). The CPU 5b further estimates the exhaust gas recirculation rate and based on the estimated EGR rate corrects the fuel injection amount to be supplied to the engine and determines the ignition timing to be supplied to the engine in a manner explained later.

Figure 2:
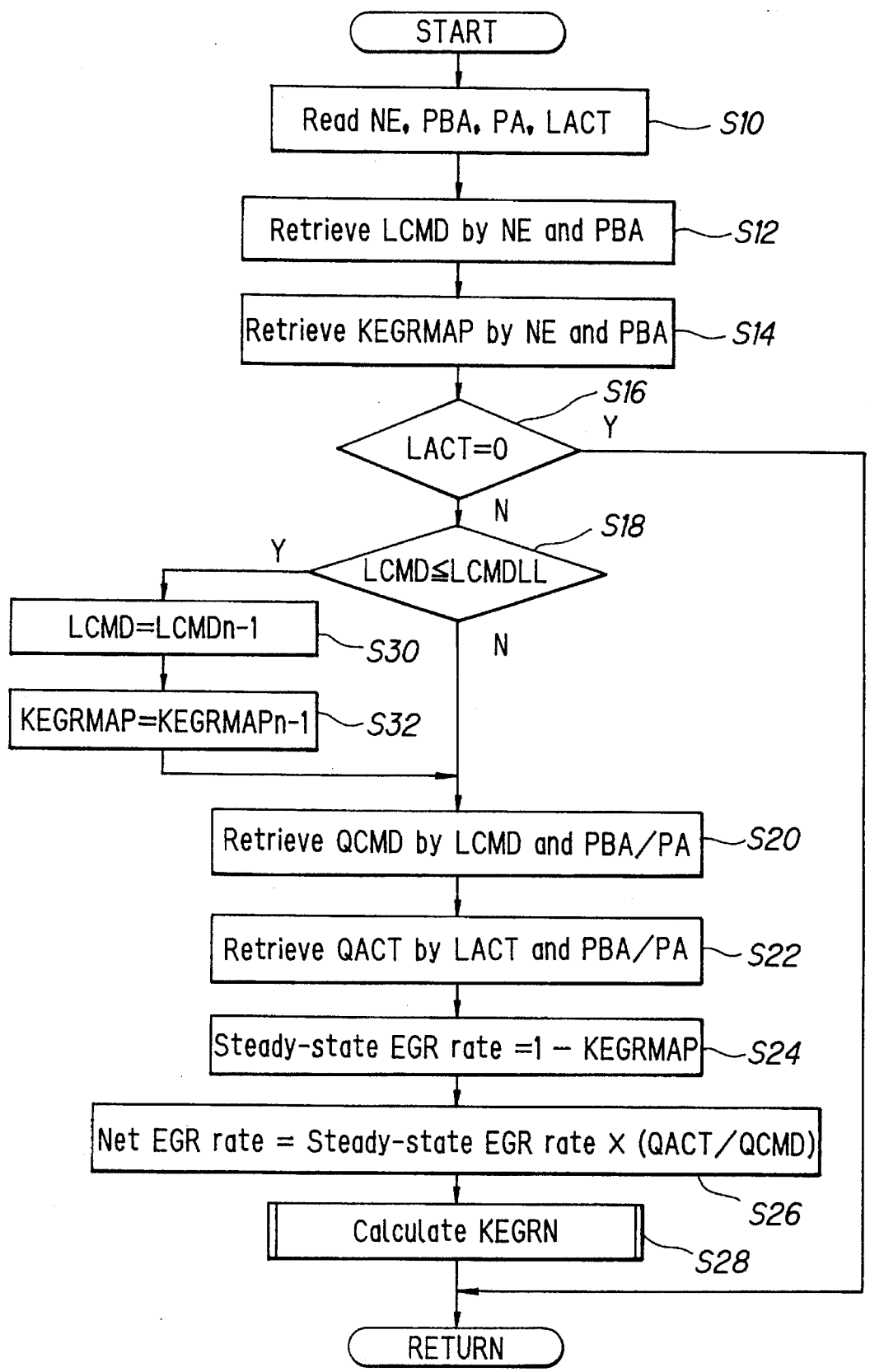
FIG. 2 is a flowchart showing the operation of the EGR rate estimation system for an internal combustion engine.

FIG. 2 is a flowchart showing the operation of the EGR rate estimation system according to the invention.

Before starting the explanation of the flowchart, however, the EGR rate estimation according to the invention will be briefly described.

Viewing the EGR control valve 19 alone, the amount or flow rate of exhaust gas passing therethrough will be determined from its opening area (the aforesaid amount of lifting) and the ratio between the upstream pressure and downstream pressure at the valve. In other words, the amount or flow rate of the mass of exhaust gas passing through the valve will be determined from the flow rate characteristics of the valve, i.e., determined from the valve design specification.

Viewing therefore the EGR control valve 19 in the engine, it will be possible to estimate the exhaust gas recirculation rate to a large degree by detecting the amount of the EGR control valve lifting and the ratio between the manifold absolute pressure PBA (negative pressure) in the intake pipe 2 and the atmospheric pressure PA exerted through the conduit 23. (Although, in practice, the exhaust gas flow rate characteristics change slightly with exhaust manifold pressure and exhaust gas temperature, the change can be absorbed by the ratio between the gas flow rates as explained later.) The invention is based on this concept and estimates the EGR rate on the basis of the flow rate characteristics of the valve.

The EGR rate will be classified into two kinds of rates, i.e., one at a steady-state and the other at a transient state. Here, the steady-state is a condition in which the EGR operation is stable and the transient state is a condition in which the EGR operation is being started or terminated so that the EGR operation is unstable.

Figure 3:
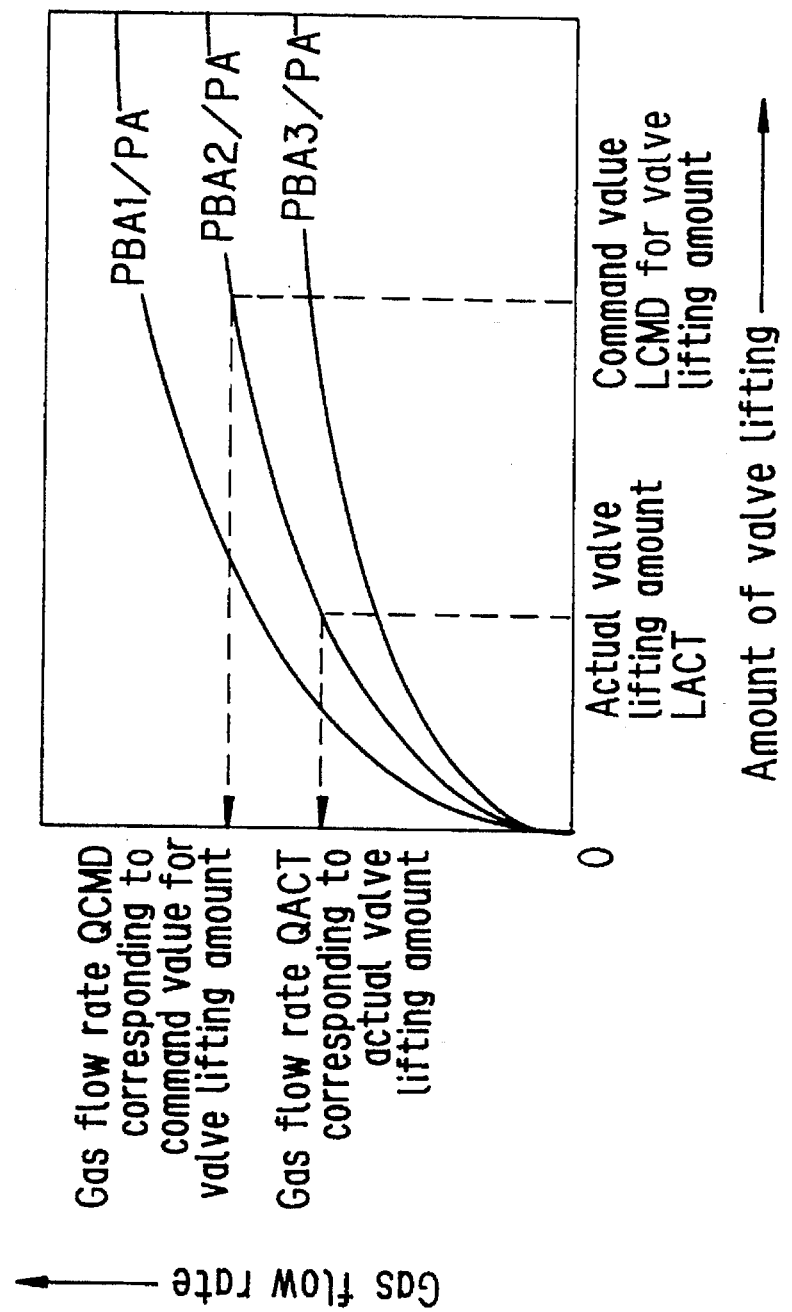
FIG. 3 is an explanatory view showing the flow rate characteristics of the EGR control valve determined by the amount of valve lifting and the ratio between upstream pressure (manifold absolute pressure) and downstream pressure (atmospheric pressure)

The inventors consider that the EGR rate at a steady-state is a value where the amount of actual valve lifting is equal to the command value for valve lifting amount. On the other hand, the transient state is a condition in which the amount of actual valve lifting is not equal to the command value so that the EGR rate deviates from the EGR rate at a steady-state (hereinafter referred to as "steady-state EGR rate) by the exhaust gas flow rate corresponding to the discrepancy in the actual amount and the command value, as illustrated in FIG. 3. (In the figure, the upstream pressure is indicated by the manifold absolute pressure PBA and the downstream pressure by the atmospheric pressure PA)

This will be summarized as follows:

At a steady-state, command value=actual valve lifting amount, and gas flow rate corresponding to actual valve lifting amount/ gas flow rate corresponding to command value=1.0

At a transient, command value≠actual valve lifting amount, and gas flow rate corresponding to actual valve lifting amount/ gas flow rate corresponding to command value≠1.0

As a result, it can be concluded that:

net EGR rate=(steady-state EGR rate)×(ratio between gas flow rates).

Thus, by determining the steady-state EGR rate to a desired value with respect to engine operating conditions at least including the engine speed and the engine load, it becomes possible to estimate the exhaust gas recirculation rate by multiplying the steady-state EGR rate by the ratio between the gas flow rates corresponding to the actual valve lifting amount and command value.

More precisely, it is considered that:

net EGR rate=(steady-state EGR rate)×{(gas flow rate QACT determined by actual valve lifting amount and the ratio between upstream pressure and downstream pressure of valve)/(gas flow rate QCMD determined by command value and the ratio between upstream pressure and downstream pressure of valve)}

In the specification, the steady-state EGR rate is calculated by determining a correction coefficient at a steady-state and subtracting the same from 1.0. Namely, calling the correction coefficient at a steady-state as KEGRMAP, the steady-state EGR rate can be calculated as follows.

EGR rate at steady-state=(1−KEGRMAP)

Figures 4, 5:
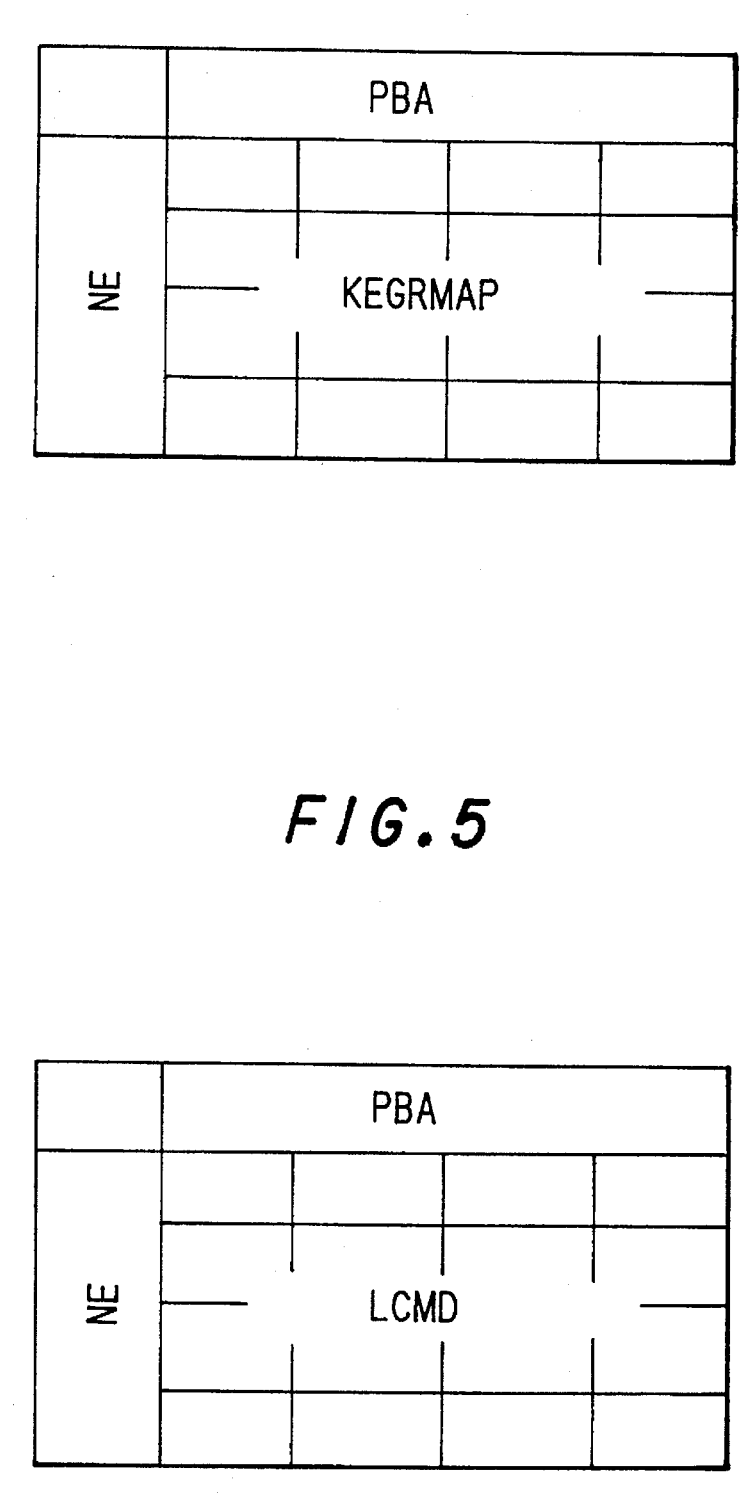

The steady-state EGR rate and the correction coefficient at a steady-state are sometimes referred to as the "basic EGR rate" and "basic correction coefficient". And as mentioned before, in order to distinguish the EGR rate at a steady state, the EGR rate is sometimes referred to as the "net EGR rate". The correction coefficient at a steady-state KEGRMAP has been determined through experiments beforehand with respect to the engine speed NE and the manifold absolute pressure PBA and is prepared as mapped data as illustrated in FIG. 4 such that the value can be retrieved based on the parameters.

Here, the EGR (exhaust gas recirculation rate) is again explained.

The EGR rate is used in various manners in references such as:

1) the mass of recirculated exhaust gas/the mass of intake air and fuel;

2) the volume of recirculated exhaust gas/the volume of intake air and fuel;

3) the mass of recirculated exhaust gas/the mass of intake air and the recirculated exhaust gas.

The EGR rate is used in the specification mainly under the definition of 3). More concretely, the steady-state EGR rate is obtained by (1- coefficient KEGRMAP). The coefficient KEGRMAP is specifically determined to as a value indicative of;

fuel injection amount under EGR operation/fuel injection amount under no EGR operation More specifically, the exhaust gas recirculation rate is determined by multiplying the basic EGR rate (the steady-state EGR rate) by the ratio between the gas flow rates as just mentioned before. As will be apparent from the description, since the EGR rate is determined as a relative value to the basic EGR rate, the EGR rate estimation system according to the invention will be applied to any EGR rate defined in 1) to 3) when the basic EGR rate is determined in the same manner.

Now the operation of the system will be explained with reference to the flowchart of FIG. 2. The program is activated once per predetermined interval such as 10 ms.

The program begins at step S10 in which the engine speed NE, the manifold absolute pressure PBA, the atmospheric pressure PA, and the actual valve lifting amount (the output of the sensor 24) LACT are read, and proceeds to step S12 in which the command value for valve lifting amount LCMD is retrieved from mapped data using the engine speed NE and the manifold absolute pressure PBA as address data. Like the aforesaid correction coefficient, the mapped data for the command value LCMD is predetermined with respect to the same parameters as illustrated in FIG. 5. The program then moves to step S14 in which the basic EGR rate correction coefficient KEGRMAP is retrieved from the mapped data at least using the engine speed NE and the manifold absolute pressure as illustrated in FIG. 4.

The program then advances to step S16 in which it is confirmed that the actual valve lifting amount LACT is not zero, namely it is confirmed that the EGR control valve 19 is opened, to step S18 in which the retrieved command value LCMD is compared with a predetermined lower limit LCMDLL (a least value) to determine whether the retrieved command value is less than the lower limit. If step S18 finds that the retrieved command value is not less than the lower limit, the program proceeds to step S20 in which the ratio PBA/PA between the manifold absolute pressure PBA and the atmospheric pressure PA is calculated and using the calculated ratio and the retrieved command value LCMD, the gas flow rate QCMD corresponding thereto is retrieved from mapped data which has been prepared in advance on the basis of the characteristics illustrated in FIG. 3. The gas flow rate is that mentioned in the equation as "gas flow rate QCMD determined by command value and the ratio between upstream pressure and downstream pressure of valve".

The program then goes to step S22 in which the gas flow rate QACT is retrieved from mapped data (not shown) similarly prepared in advance based on the characteristics illustrated in FIG. 3. This corresponds to the term in the equation "gas flow rate QACT determined by actual valve lifting amount and the ratio between upstream pressure and downstream pressure of valve". The program then proceeds to step S24 in which the retrieved EGR rate correction coefficient KEGRMAP is subtracted from 1.0 and the difference resulting therefrom is deemed as the steady-state EGR rate (basic EGR rate).

The program then moves to step S26 in which the net exhaust gas recirculation rate is calculated by multiplying the steady-state EGR rate by the ratio QACT/QCMD, to step S28 in which a fuel injection correction coefficient KEGRN is calculated.

Figure 6:
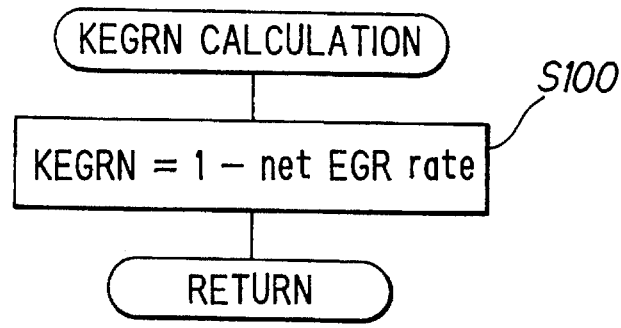
FIG. 6 is a flowchart showing the subroutine of the flowchart of FIG. 2 for calculating a coefficient KEGRN.

FIG. 6 is a flowchart showing the subroutine for calculating the coefficient KEGRN.

In step S100 in the flowchart, the net EGR rate is subtracted from 1.0 and the difference resulting therefrom is deemed to be the fuel injection correction coefficient KEGRN. In the fuel metering or air/fuel ratio control, a basic fuel injection amount Tim is first determined at least based on the engine speed NE and the engine load such as the manifold absolute pressure PBA and the coefficient KEGRN will then be multiplied by the basic fuel injection amount Tim to determine a final fuel injection amount Tout to be supplied to the engine. Since, however, the correction method itself is known in the art, no further explanation will be given.

Returning to the flowchart of FIG. 2, when it is found in step S16 that the actual valve lifting amount LACT is zero, since this means that the EGR operation is not carried out, the program is immediately terminated. When it is found in step S18 that the command value for valve lifting amount LCMD is less than the lower limit LCMDLL, the program proceeds to step S30 in which the command value LCMDn−1 from the last control cycle n−1 (the period at the last program loop) is again used in the current control cycle. (For brevity of illustration, the addition of subscript "n" to the values at the current control cycle is omitted.)

This is because, when the command value to valve lifting amount LCMD is made zero in order to terminate the EGR operation, the actual valve lifting amount LACT does not immediately become zero due to the delay in valve response. Therefore, when the command value LCMD is less than the lower limit, the previous value LCMDn−1 is kept until step S16 finds that the actual valve lifting amount LACT has become zero.

Moreover, when the command value LCMD is less than the lower limit LCMDLL, the command value may occasionally be zero. If this happens, the gas flow rate QCMD retrieved at step S20 becomes zero and as a result, division by zero would occur at the calculation in step S26, making the calculation impossible. Since, however, the previous value is kept in step S30, the calculation can be successfully carried out in step S26.

The program then proceeds to step S32 in which the basic correction coefficient KEGRMAPn−1 retrieved at the last control cycle is again used in the current control cycle. This is because, at such engine operating conditions that the command value LCMD retrieved in step S12 is found to be less than the lower limit LCMDLL in step S18, the basic EGR rate correction coefficient KEGRMAP retrieved in step S14 will be 1.0 based on the characteristics of the mapped data. As a result, there is the possibility that the steady-state EGR rate is determined to be 0 in step S24. The keeping of the last value in step S32 aims to avoid this.

Since the estimation of the EGR rate, more precisely the net EGR rate is made based on the assumption that the deviation between the transient EGR rate and the steady-state EGR rate can be described by the ratio of gas flow rates, the system in this embodiment, less complicated than that disclosed in the earlier publication (5-118,239), is able to describe the behavior of the exhaust gas more correctly. And when comparing the system with another disclosed in this earlier application (5-296,049), the system in the embodiment is able to estimate the net EGR rate more accurately, since the behavior of the exhaust gas is expressed on the basis of the flow rate characteristics of the EGR control valve.

Moreover, as this embodiment utilizes the concept of the ratio between gas flow rates, it can successfully take into account the influence of the exhaust manifold pressure and exhaust gas temperature. This also helps to enhance estimation accuracy. Furthermore, when the command value for valve lifting amount is made zero in order to terminate the EGR operation, the last command value is kept used until the actual valve lifting amount becomes zero, making it possible to absorb the delay in valve response and estimate the EGR rate properly. At the same time, it can prevent the calculation from failing due to division by zero, etc.

And in the fuel metering or air/fuel ratio control, since the fuel injection correction coefficient KEGRN is determined on the basis of the net EGR rate, the air/fuel ratio can be controlled to a desired value with high accuracy, and the occurrence of a lean or a rich spike can be prevented.

It should be noted that, although the lower limit LCMDLL is set to be a least value, it is alternatively possible to set it to zero.

It should also be noted that, although the last control cycle values LCMDn−1 and KEGRMAPn−1 are kept, it is alternatively possible to use values obtained 2 or more control cycles earlier.

Figure 7:
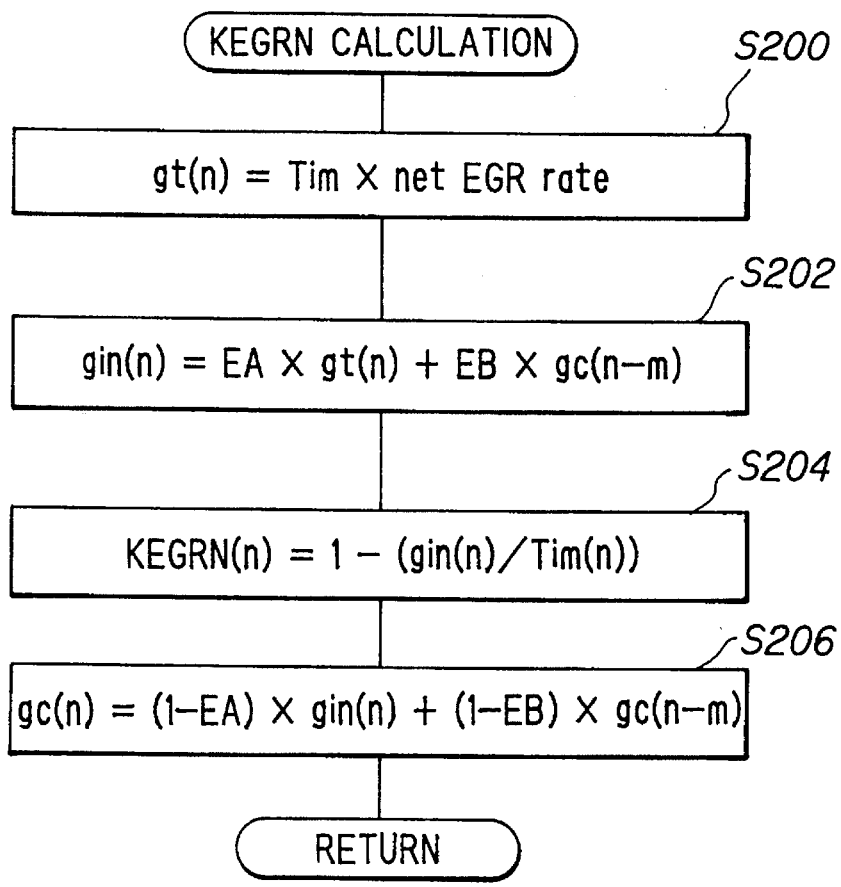
FIG. 7 is a flowchart, similar to FIG. 6, but showing a second embodiment of the invention.

FIG. 7 is a flowchart showing a second embodiment of the invention.

The second embodiment uses the transport delay compensation of the recycled exhaust gas taught by the earlier publication (5-118,239). Although the transport delay of the recirculated exhaust gas is not taken into consideration in the first embodiment, the second embodiment compensates the transport delay. For that purpose specifically, the fuel injection correction coefficient KEGRN is calculated in a manner different from that in the first embodiment.

Explaining the second embodiment with reference to FIG. 7, the program begins at step S200 in which the net EGR rate (obtained at S26 in FIG. 2) is multiplied by the basic fuel injection amount Tim determined from the engine speed and the manifold absolute pressure to obtain a required amount of exhaust gas gt(n)(n: current control cycle). The required amount gt (n) of exhaust gas means the amount of the exhaust gas that is presumed to apparently or virtually pass through the EGR control valve 19.

The program then advances to step S202 in which the whole amount of recycled exhaust gas gin(n) that is presumed to actually enter the combustion chamber during the control cycle or period n is calculated in accordance with the equation illustrated. Here, the other terms used in the equation will be explained.

EA: direct ratio (the ratio of a fraction, to the exhaust gases passing through the EGR control valve during the control cycle n, of the exhaust gas that enters the combustion chamber during the control cycle n);

EB: carry-off ratio (the ratio of a fraction, to the exhaust gases gc(n-m) which passed through the value by a period m cycle earlier (m≧1), but remained in the space before the combustion chamber, of the exhaust gas that enters the combustion chamber during the control cycle n).

Namely, by multiplying gt(n) by EA to determine the amount of exhaust gas passing through the EGR control valve 19 and entering the combustion chamber during the control cycle n, and by multiplying gc(n-m) by EB to determine the amount of exhaust gas remaining and entering the combustion chamber during the control cycle n, and further by adding the product together, an estimate of the total amount gin(n) of exhaust gas that enters the combustion chamber during the control cycle n can be obtained.

The program then proceeds to step S204 in which the amount gin (n) is divided by the basic fuel injection amount Tim(n) of the same cycle and by subtracting the quotient from 1.0, the fuel injection correction coefficient KEGRN is calculated, to step S206 in which the exhaust gas amount gc(n) is updated for the calculation at the next control cycle so that in the next control cycle (n+1), the amount gc(n) will be rewritten as gc(n−1) in step S202 and the amount gin(n) will be calculated. Since the transport delay compensation is described in detail in the aforesaid earlier publication (5-118,239), no further explanation will now be given.

In the second embodiment, with the arrangement so described, it becomes possible to correct the fuel injection amount properly even when a transport delay of the recycled exhaust gas occurs.

It should be noted that the transport delay could instead be assumed simply to be a first order lag.

It should be also noted that any parameter concerning the transport delay can be corrected by the net EGR rate.

Figure 8:
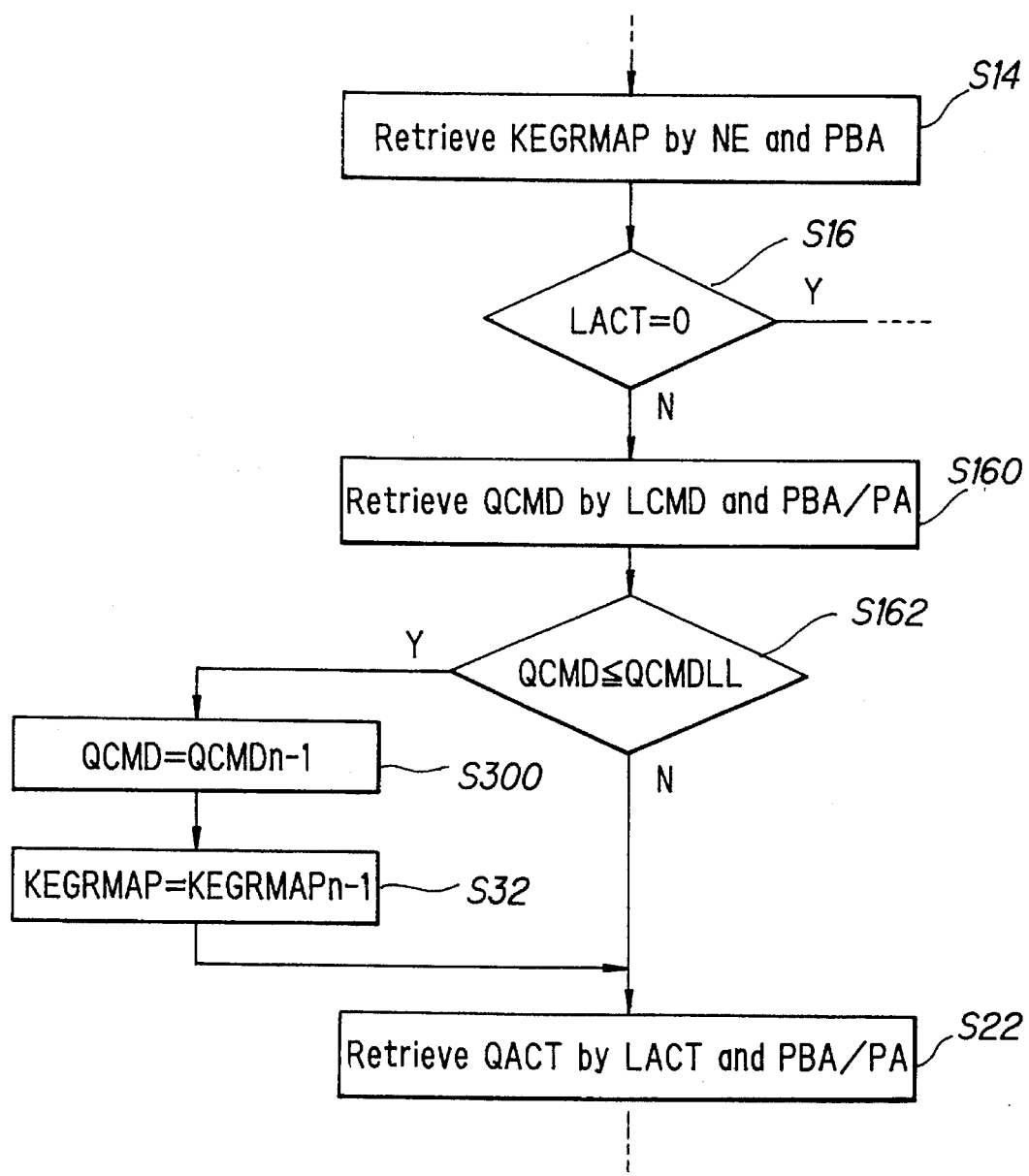
FIG. 8 is a flowchart, similar to a portion of the flowchart of FIG. 2, but showing a third embodiment of the invention.

FIG. 8 is a portion of the flowchart of FIG. 2, but shows a third embodiment of the invention.

In the third embodiment, if it is confirmed in step S16 that the actual valve lifting amount LACT is not zero, the program proceeds to step S160 in which the gas flow rate QCMD is retrieved, to step S162 in which the gas flow rate QCMD is compared with a lower limit QCMDLL (a least value). If it is found in step S162 that the command value is less than the lower limit, the program proceeds to step S300 in which the last command value QCMDn−1 is kept. The rest of the third embodiment as well as the advantages thereof are the same as the first embodiment.

Figure 9:
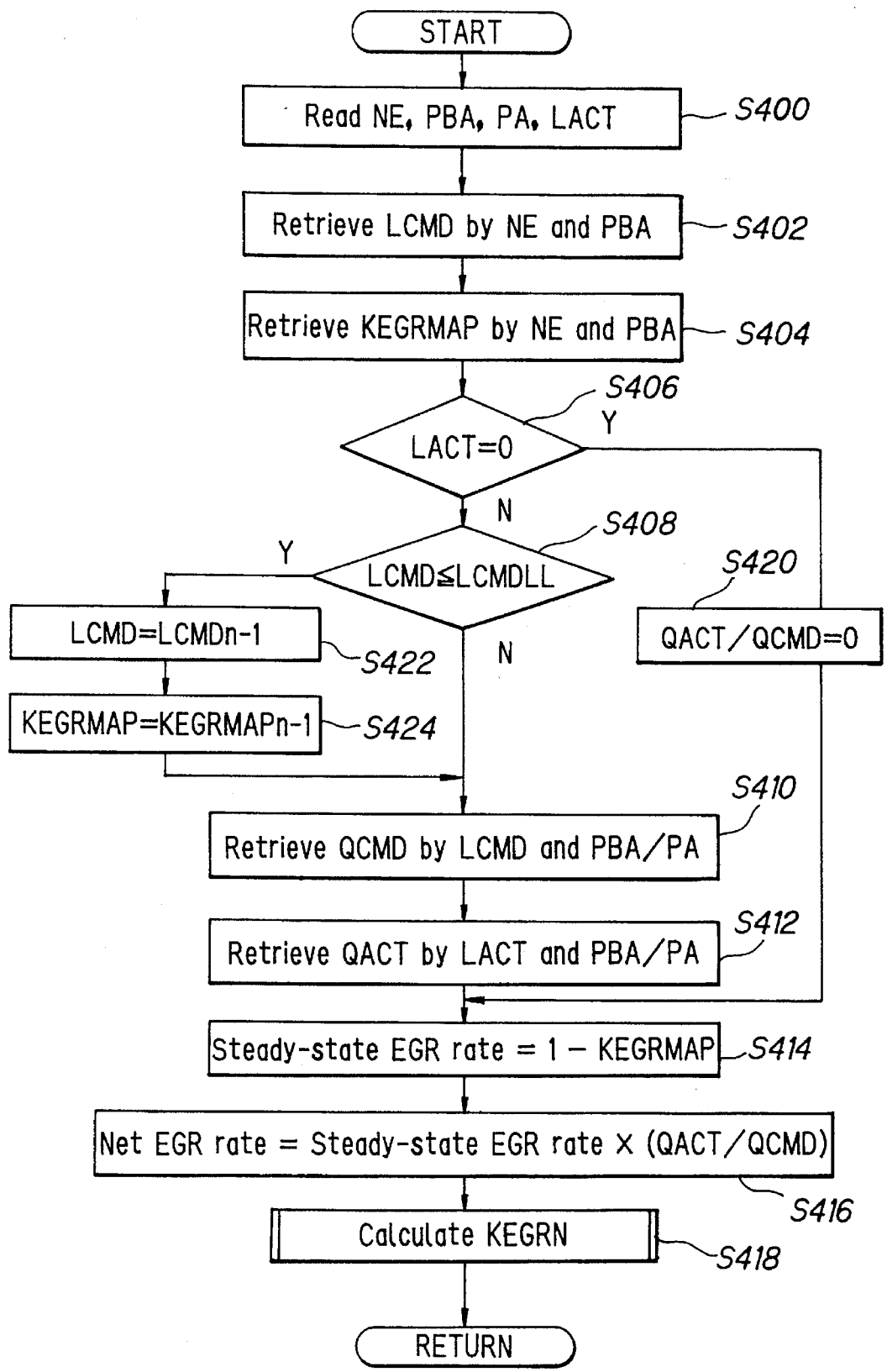
FIG. 9 is a flowchart, similar to FIG. 2, but showing a fourth embodiment of the invention.

FIG. 9 is a flowchart, similar to FIG. 2, but showing a fourth embodiment of the invention.

As mentioned before, the actual valve lifting lags behind the command for valve lifting and there exists an additional delay for the exhaust gas passing through the valve to enter the combustion chamber.

Observing further the behavior of the exhaust gas, the inventors have found it easier to describe the behavior of the exhaust gas if the exhaust gas passing through the valve is assumed to remain for a while in the space (chamber) before the combustion chamber and after a pause, i.e. the delay time, enters the combustion chamber at a certain time. In the fourth embodiment, therefore, the net EGR rate is consecutively estimated and is stored in the memory 5c each time the program is activated. And among the stored net EGR rates, one estimated at a previous control cycle corresponding to the delay time is selected and is deemed to be the true net EGR rate.

The fourth embodiment will now be explained with reference to the flowchart of FIG. 9. The program of the figure is activated at each TDC position.

The flowchart of FIG. 9 is almost the same as that in FIG. 2 in the first embodiment. The program begins at step S400 and proceeds to step S418 in a manner similar to the flowchart of FIG. 2, and the fuel injection correction coefficient KEGRN is calculated.

Figure 10:
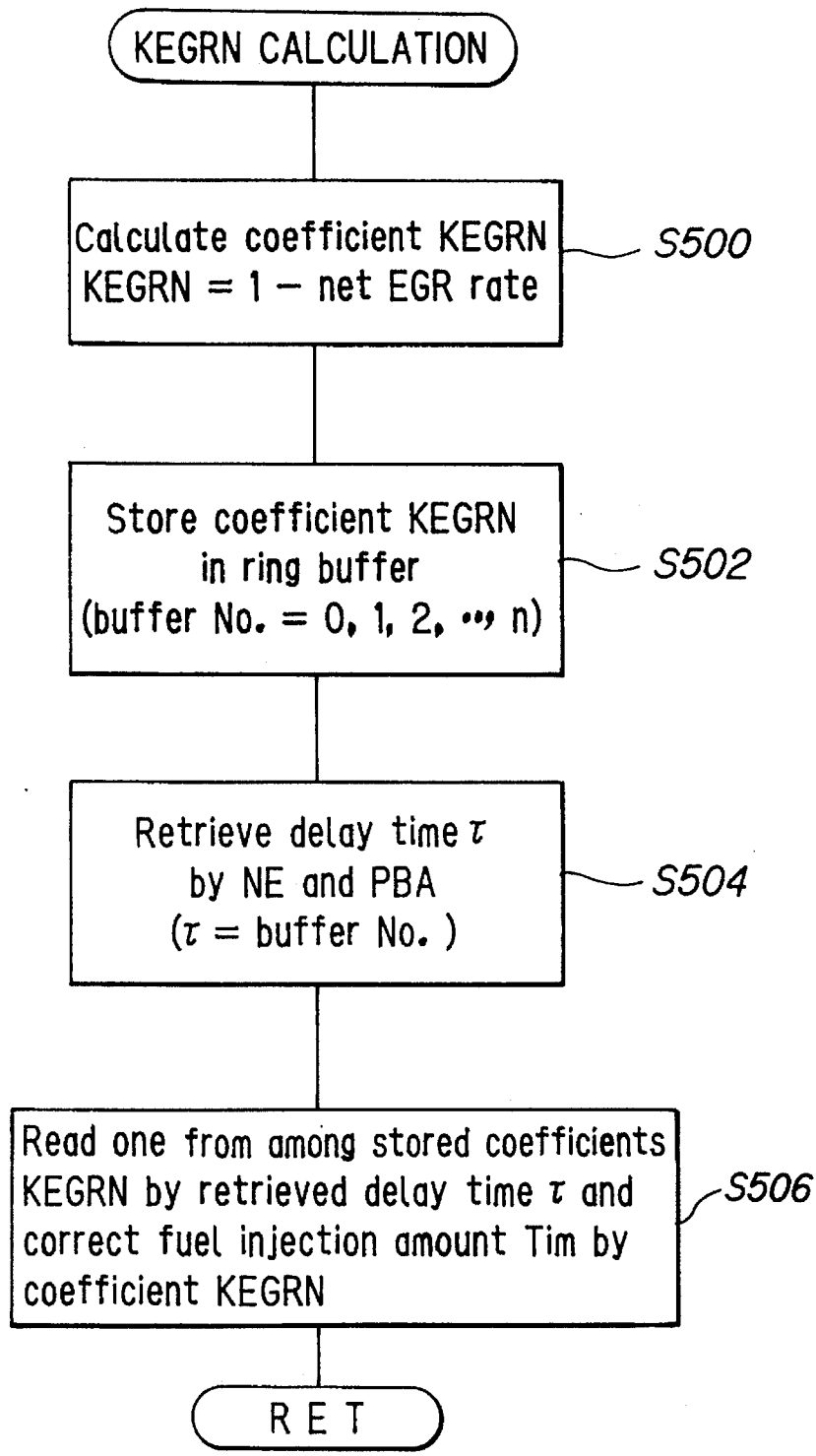
FIG. 10 is a flowchart showing the subroutine of the flowchart of FIG. 9 for calculating the coefficient KEGRN.

FIG. 10 is a flowchart showing the subroutine for the coefficient calculation.

In the figure, the program starts at step S500 in which the fuel injection correction coefficient KEGRN is calculated in the same manner as that in the first embodiment. The program then proceeds to step S502 in which the calculated coefficient KEGRN is stored in a ring buffer prepared in the aforesaid memory 5c. FIG. 11 shows the configuration of the ring buffer. As illustrated, the ring buffer has n addresses which are numbered by 1 to n and so identified. Each time the programs of the flowcharts of FIGS. 9 and 10 are activated at respective TDC positions and the fuel injection correction coefficient KEGRN is calculated, the calculated coefficient KEGRN is consecutively stored in the ring buffer from the top.

In the flowchart of FIG. 10, the program then proceeds to step S504 in which the delay time $\tau$ is retrieved from mapped data using the engine speed NE and the engine load such as the manifold absolute pressure PBA as address data. FIG. 12 shows the characteristics of the mapped data. Namely, the delay time $\tau$ indicates a dead time during which the gas passing through the valve remains in the space before the combustion chamber. Since the dead time varies with engine operating conditions including the engine speed and the engine load, the delay time is set to vary with the parameters. Here, the delay time $\tau$ is set as the ring buffer number.

Figure 13:
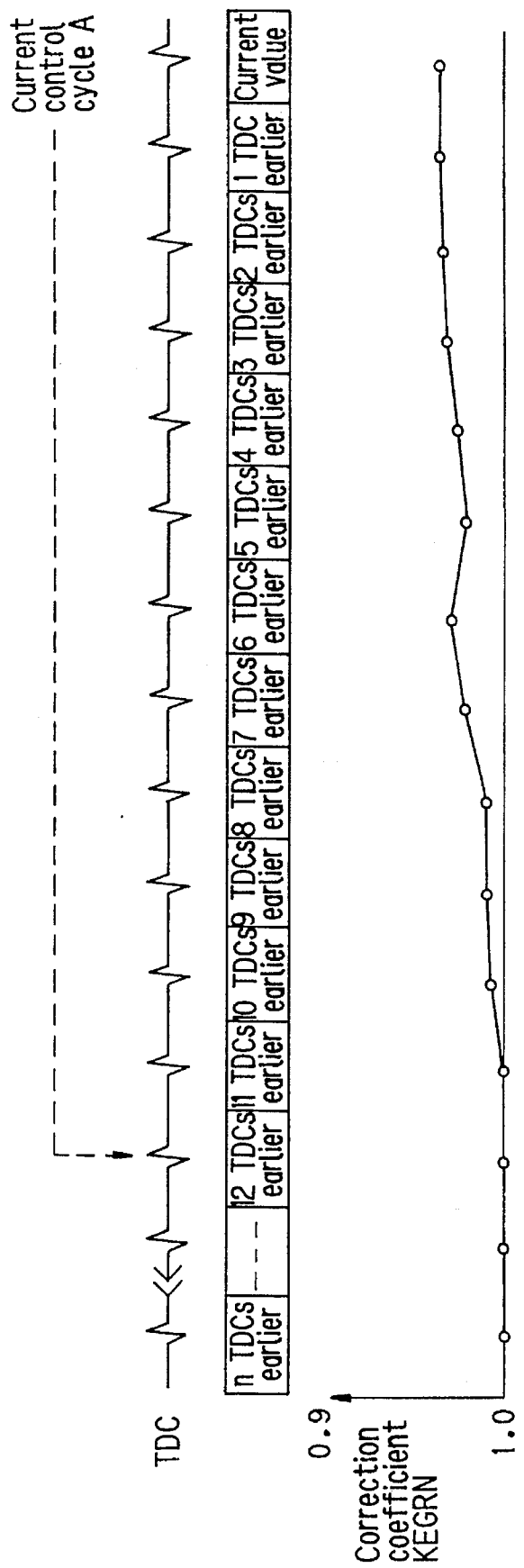
FIG. 13 is a timing chart showing the calculation of the coefficient KEGRN in the flowchart of FIG. 10.

The program then moves to step S506 in which one from among the stored fuel injection correction coefficients KEGRN corresponding to the retrieved delay time $\tau$ (ring buffer number) is read and is determined to be the correction coefficient KEGRN at the current control cycle. Explaining this in reference to FIG. 13, when the current control cycle (or period) is at A, the coefficient calculated 12 control cycles earlier is, for example, selected as the coefficient to be used in the current control cycle. The fuel injection correction is carried out by multiplying the basic fuel injection amount Tim by the thus selected coefficient KEGRN as was explained before.

Again returning to FIG. 9, when step S406 finds that the actual valve lifting amount LACT is zero, the program proceeds to step S420 in which the ratio is made zero, to step S414 and on in which the net EGR rate is calculated as 0 and the fuel injection correction coefficient KEGRN is calculated as 1.0. Differing from the first embodiment, when the value LACT is found to be zero so that no EGR operation is carried out, since the correction coefficient KEGRN at this time will be a candidate at the selection in later control cycles, it has to be calculated. The rest of the flowchart is the same as that in the first embodiment.

In the fourth embodiment, since the net EGR rate is consecutively estimated on the basis of the engine speed and manifold absolute pressure and based thereon the coefficient is consecutively calculated and stored at every control cycle. And the delay time during which exhaust gas passed through the valve, but remains before the combustion chamber is determined from the same parameters and one from among the stored coefficients calculated at an earlier control cycle corresponding to the delay time is selected as the coefficient at the current control cycle. This system decreases complicated calculations and greatly reduces calculation uncertainties, making configuration thereof simpler, and it can estimate the net EGR rate accurately and makes it possible to correct the fuel injection amount with high accuracy.

Figure 14:
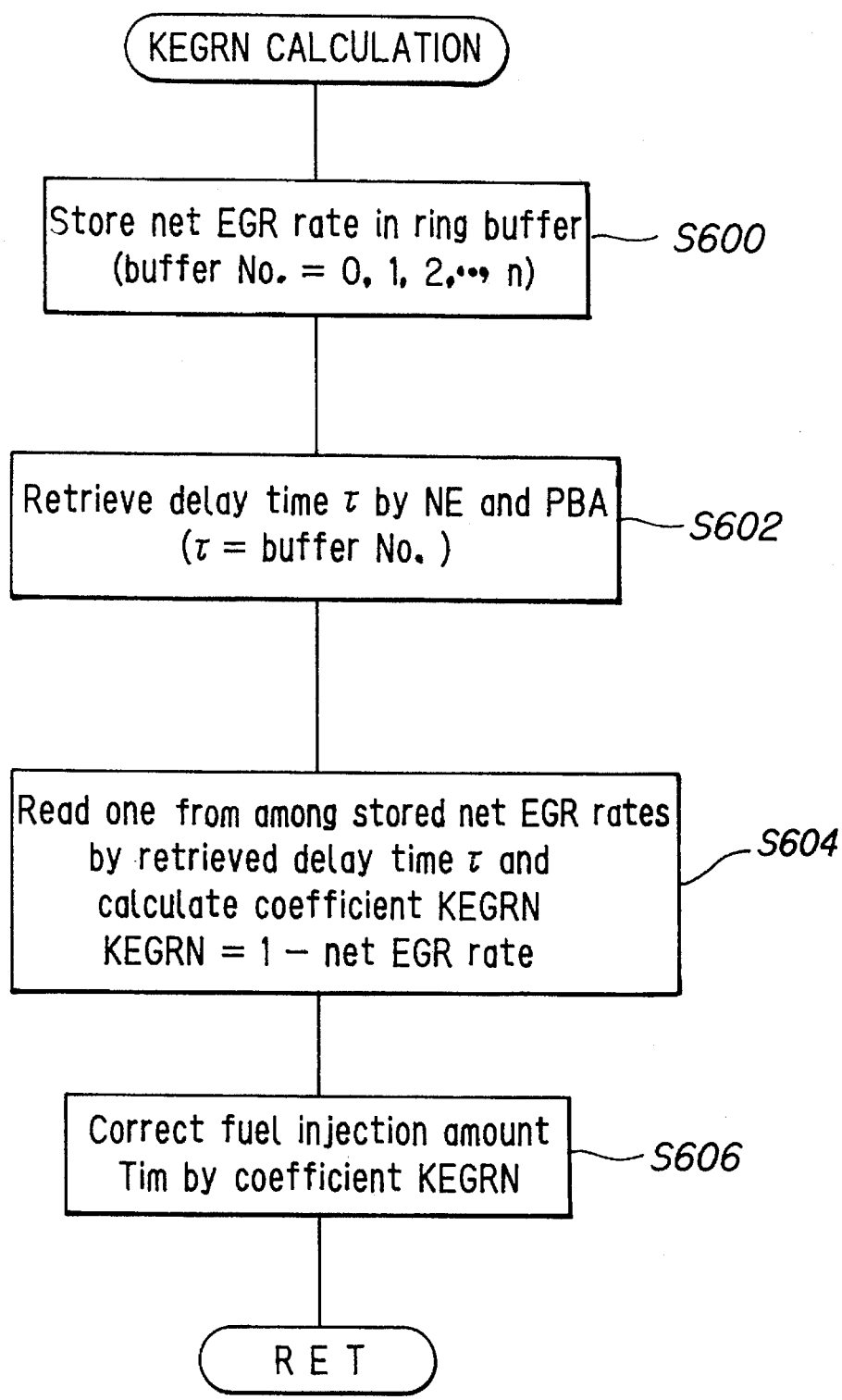
FIG. 14 is a flowchart, similar to FIG. 10, but showing a fifth embodiment of the invention.

FIG. 14 is a flowchart, similar to FIG. 10, but shows a fifth embodiment of the invention.

In the fifth embodiment, the program starts at step S600 in which the net EGR rate is stored in a ring buffer similar to that used in the fourth embodiment, and proceeds to step S602 in which the delay time τ is retrieved in the same manner as the fourth embodiment, to step S604 in which one from among the stored net EGR rates estimated at an earlier control cycle corresponding to the delay time is read. The selected rate is hereinafter referred to as the "true net EGR rate" as mentioned above and based on the true net EGR rate, the coefficient KEGRN is calculated. The program then advances to step S606 in which the fuel injection amount is corrected by the coefficient KEGRN.

With this arrangement, the fifth embodiment has the same advantages as those of the fourth embodiment.

Figure 15:
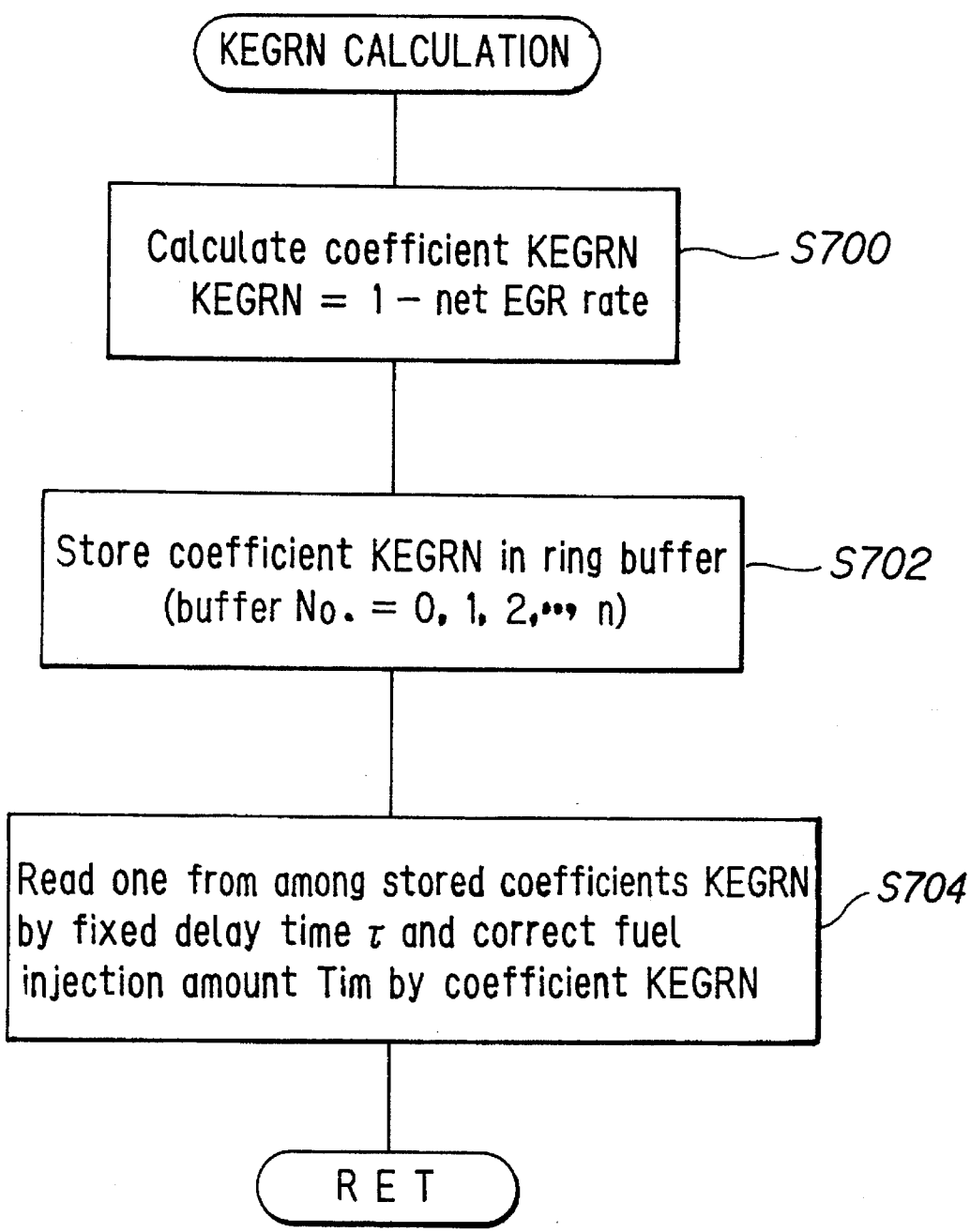
FIG. 15 is a flowchart, similar to FIG. 10, but showing a sixth embodiment of the invention.

FIG. 15 is a flowchart, similar to FIG. 10, but shows a sixth embodiment of the invention.

The sixth embodiment is a modification of the fourth embodiment and the program begins at step S700 and proceeds, via step S702, to step S704 in which one from among the stored correction coefficients is selected using a predetermined delay time τ. The delay time τ is a fixed ring buffer address such as 12, i.e., the delay time of 12 TDCs earlier, for example.

Except for the fact that the delay time is a fixed value, the rest of the configuration and advantages are the same as those of the fourth embodiment. The delay time can be determined and fixed through experiments by varying the distance between the EGR control valve and the combustion chamber and some similar parameters. The delay time will therefore vary with different engines.

It should be noted that it is alternatively possible in the sixth embodiment to store, instead of the coefficient, the net EGR rate.

Figure 16:
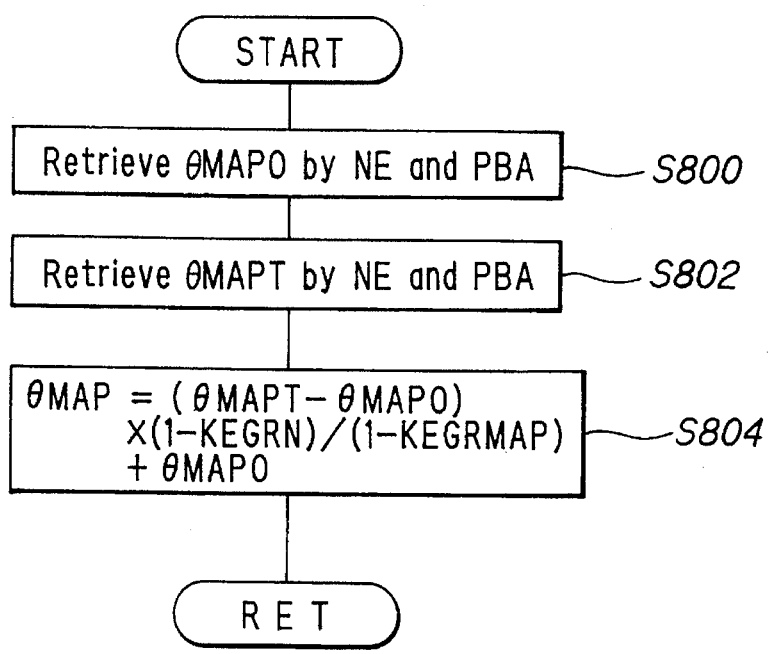
FIG. 16 is a flowchart showing the determination of ignition timing according to a seventh embodiment of the invention.

FIG. 16 is a flowchart showing a seventh embodiment of the invention.

The flowchart in the figure shows the determination of a basic ignition timing θMAP.

The program begins at step S800 in which a basic ignition timing θMAPO under no EGR operation is determined by retrieving mapped data under no EGR operation with the current engine speed NE and manifold absolute pressure PBA. The program then proceeds to step S802 in which another basic ignition timing θMAPT under EGR operation is determined by retrieving other mapped data under EGR operation.

Figure 17:
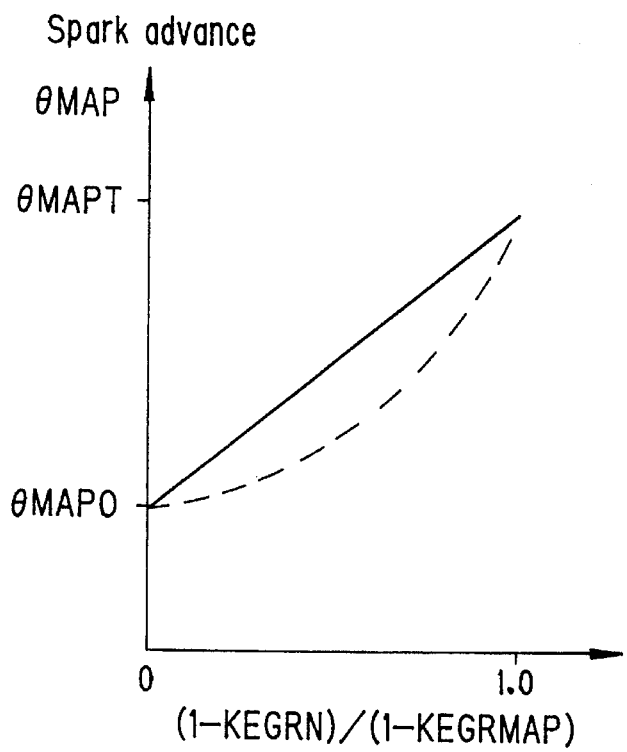
FIG. 17 is an explanatory view showing the relationship between mapped data referred to in the flowchart of FIG. 16.
Figure 18:
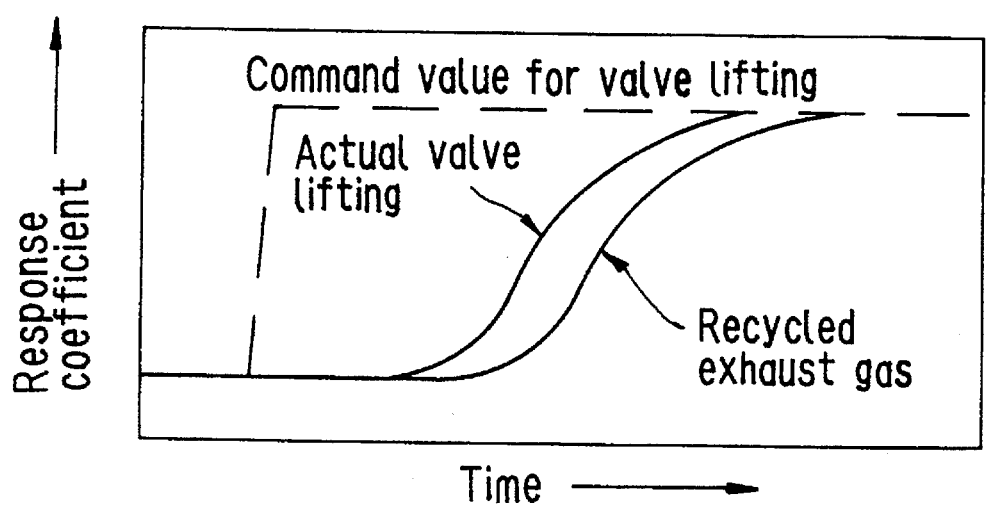
FIG. 18 is a timing chart showing a delay in actual valve lifting to a command value and another delay until exhaust gas enters the combustion chamber of the engine.

The program then moves to step S804 in which a basic ignition timing θMAP is calculated using the equation illustrated. In the equation, since the fuel injection correction coefficient KEGRN becomes 1.0 when the EGR is not operated, the basic ignition timing θMAP will be the same as the basic ignition timing θMAPO under no EGR operation. FIG. 17 illustrates the relationship between the mapped data characteristics and the terms used in the equation.

On the other hand, at a condition when the fuel injection correction coefficient KEGRN and the steady-state fuel injection correction coefficient KEGRMAP become the same value, the basic ignition timing θMAP under EGR operation will be the basic ignition timing θMAP. If the values KEGRN and KEGRMAP are not the same, the basic ignition timing θMAP will be a value along the solid line obtained by interpolating the first basic ignition timing θMAPO under no EGR operation and the second basic ignition timing θMAPT under EGR operation. (Even when the actual basic ignition timing is any value along the dashed line, the difference between the solid line and the dashed line is slight, causing little problem.)

In the seventh embodiment, since the fuel injection correction coefficient KEGRN determined in view of the delay time is used to determine the basic ignition timing, it becomes possible to accurately control the ignition timing at a desired value when the EGR operation is carried out.

It should be noted that the basic ignition timing thus determined in the seventh embodiment will further be subjected to engine coolant temperature correction or intake air temperature correction and the corrected ignition timing will then be output to the ignition system.

It should also be noted that, although the basic ignition timing is determined using the coefficient KEGRN etc., it is alternatively possible to determine a basic ignition timing and then correct it with the coefficient KEGRN etc.

It should further be noted that the fuel injection correction coefficient KEGRN used in the seventh embodiment is any one that is determined in the foregoing fourth to sixth embodiments determined using the concept of the delay time. When using that determined in the fifth embodiment, it is alternatively possible to store, instead of (1−KEGRN), the net EGR rate.

It should further be noted that the fuel injection correction coefficient at a steady-state KEGRMAP should preferably be stored in a ring buffer at the same time when the fuel injection coefficient KEGRN or the net EGR rate is stored in the ring buffer in the foregoing fourth to sixth embodiments. It is preferable to calculate in advance a value (1−KEGRN)/(1−KEGRMAP) and store it in a ring buffer in the same manner as the coefficient KEGRN. Further, when the value (1−KEGRN)/(1−KEGRMAP) exceeds 1.0, the value must be restricted to 1.0 such that the basic ignition timing θMAP does not exceeds the basic ignition timing θMAPT under EGR operation in the direction of spark advance.

It should be noted in the fourth to sixth embodiments that, although the fuel injection correction coefficient or the net EGR rate is stored and selected by the delay time, it is alternatively possible to store the parameters including engine speed necessary for calculating the net EGR rate or the fuel injection correction coefficient, to retrieve the parameters using the delay time as address datum, and to calculate the net EGR rate or the fuel injection correction coefficient using the retrieved parameters.

It should be noted in the foregoing first to seventh embodiments that, although atmospheric pressure is used in the foregoing embodiments, it is alternatively possible to use the exhaust manifold pressure.

It should also be noted that, although the values LCMD, KEGRMAP, QCMD, QACT are prepared as pre-stored mapped data, it is alternatively possible to obtain the same through respective calculations.

It should further be noted that, although the vacuum-operated EGR control valve is used in the foregoing embodiments, it is alternatively possible to use a power-operated EGR control valve.

It should further be noted that, although the manifold absolute pressure is used as the parameter indicative of the engine load, it is alternatively possible to use other parameters such as amount of intake air, throttle position, etc.

The present invention has thus been shown and described with reference to the specific embodiments. However, it should be noted that the present invention is in no way limited to the details of the described arrangements but changes and modifications may be made without departing from the scope of the appended claims.

What is claimed is:

1. A system for estimating an exhaust gas recirculation rate for an internal combustion engine, said engine having a passage connecting an exhaust pipe to an intake pipe for recirculating a portion of exhaust gases in said exhaust pipe to a combustion chamber through said intake pipe, and a valve provided at said passage for regulating an amount or a flow rate of said exhaust gas to be recirculated in response to a command value for valve lift amount, comprising:

engine operating condition detecting means for detecting operating conditions of said engine at least including engine speed and engine load;

basic exhaust gas recirculation rate determining means for determining a basic exhaust gas recirculation rate (1−KEGRMAP) at least based on said detected engine speed and engine load;

first flow rate estimating means for estimating a first flow rate (QACT) of said exhaust gas passing through said valve based on flow rate characteristics of said valve including a valve lifting amount (LACT);

second flow rate estimating means for estimating a second flow rate (QCMD) of said exhaust gas to be recirculated passing through said valve based on flow rate characteristics of said valve including said command value for valve lifting amount (LCMD);

net exhaust gas recirculation rate estimating means for estimating a net exhaust gas recirculation rate based on said basic exhaust gas recirculation rate (1−KEGRMAP), said first flow rate (QACT) and said second flow rate (QCMD).

2. A system according to claim 1, further including:

ignition timing means for determining an ignition timing of said engine based on said estimated net exhaust gas recirculation rate.

3. A system according to claim 1, wherein said first and second flow rate estimating means estimates said first and second flow rates (QACT, QCMD) based on a ratio between an upstream pressure and a downstream pressure acting on said valve and valve lifting amount (LACT, LCMD).

4. A system according to claim 3, wherein said first and second flow rate estimating means estimates said first and second flow rates (QACT, QCMD) based on a ratio (PBA/PA) between pressure (PBA) in said intake pipe and atmospheric pressure (PA) and valve lifting amount (LACT, LCMD).

5. A system according to claim 1, further including:

comparing means for comparing at least one of said command value for valve lifting amount (LCMD) and said second flow rate (QCMD) with a limit value (LCMDLL, QCMDLL); and keeping means for keeping at least one of said command value for valve lifting amount (LCMD) and said second flow rate (QCMD) to a predetermined value (LCMDn−1, QCMDn−1) when at least one of said command value for valve lifting amount (LCMD) and said second flow rate (QCMD) is found to be less than said limit value (LCMDLL, QCMDLL).

6. A system according to claim 5, wherein said predetermined value is a value (LCMDn−1, QCMDn−1) that has been determined at least one period earlier.

7. A system according to claim 1, wherein said net exhaust gas recirculation rate estimating means estimates said net rate of exhaust gas recirculated based on said basic exhaust gas recirculation rate (1−KEGRMAP) and a ratio (QACT/QCMD) of said first flow rate (QACT) and said second flow rate (QCMD).

8. A system according to claim 7, further including:

comparing means for comparing at least one of said command value for valve lifting amount (LCMD) and said second flow rate (QCMD) with a limit value (LCMDLL, QCMDLL); and keeping means for keeping at least one of said command value for valve lifting amount (LCMD) and said second flow rate (QCMD) to a predetermined value (LCMDn−1, QCMDn−1) when at least one of said command value for valve lifting amount LCMD and said second flow rate (QCMD) is found to be less than said limit value (LCMDLL, QCMDLL).

9. A system according to claim 7, further including:

delay time determining means for determining a delay time ($\tau$) until exhaust gas that passed through said valve enters said combustion chamber of said engine; and said net exhaust gas recirculating means estimates said net rate of exhaust gas recirculated at each predetermined cycle consecutively and selects one among said net rates that is estimated at a cycle corresponding to said delay time ($\tau$).

10. A system according to claim 1, further including:

delay time determining means for determining a delay time ($\tau$) until exhaust gas that passed through said valve enters said combustion chamber of said engine; and said net exhaust gas recirculating means estimates said net rate of exhaust gas recirculated at each predetermined cycle consecutively and selects one among said net rates that is estimated at a cycle corresponding to said delay time ($\tau$).

11. A system according to claim 10, further including:

storing means for storing said net rates consecutively; and said net exhaust gas recirculating means select one from among said stored net rates that is estimated at a cycle corresponding to said delay time ($\tau$).

12. A system according to claim 10, wherein said delay time ($\tau$) is determined based on said operating conditions of said engine.

13. A system according to claim 10, wherein said delay time ($\tau$) is a fixed value.

14. A system according to claim 1, further including:

fuel injection correction coefficient determining means for determining a fuel injection correction coefficient KEGRN based on said estimated net exhaust gas recirculation rate; and fuel injection amount correcting means for correcting a fuel injection amount based on said fuel injection correction coefficient.

15. A system according to claim 14, wherein said net exhaust gas recirculation rate estimating means estimates said net rate of exhaust gas recirculated based on said basic exhaust gas recirculation rate (1–KEGRMAP) and a ratio (QACT/QCMD) of said first flow rate (QACT) and said second flow rate (QCMD).

16. A system according to claim 14, further including:

direct ratio determining means for determining a direct ratio (EA) indicative of a ratio of an amount of exhaust gas that enters said combustion chamber during a period (n) to a whole amount of exhaust gasses (gt(n)) passing through said valve during said period (n);

carry-off ratio determining means for determining a carry-off ratio (EB) indicative of exhaust gas that enters said combustion chamber during said period (n) to exhaust gases (gc(n-m)) that passed said valve by a time (m) period earlier and that remain in a space before said combustion chamber;

exhaust gas amount determining means for determining a whole amount of exhaust gas (gin) that enters said combustion chamber during said period (n) based on said direct ratio (EA) and said carry-off ratio (EB); and said fuel injection correction coefficient determining means determines said fuel injection correction coefficient (KEGRN) based on said estimated net exhaust gas recirculation rate and said whole amount of exhaust gas (gin).

17. A system according to claim 14, further including:

ignition timing means for determining an ignition timing of said engine based on said estimated net exhaust gas recirculation rate.

18. A system according to claim 14, further including:

comparing means for comparing at least one of said command value for valve lifting amount (LCMD) and said second flow rate (QCMD) with a limit value (LCMDLL, QCMDLL); and keeping means for keeping at least one of said command value for valve lifting amount (LCMD) and said second flow rate (QCMD) to a predetermined value (LCMDn–1, QCMDn–1) when at least one of said command value for valve lifting amount (LCMD) and said second flow rate (QCMD) is found to be less than said limit value (LCMDLL, QCMDLL).

19. A system according to claim 18, wherein said predetermined value is a value (LCMDn–1, QCMDn–1) that has been determined at least one period earlier.

20. A system according to claim 14, further including:

delay time determining means for determining a delay time (τ) until exhaust gas passing through said valve enters said combustion chamber of said engine; and said fuel injection correction coefficient determining means determines said fuel injection correction coefficient (KEGRN) at each predetermined cycle consecutively and selects one from among said fuel injection correction coefficients that is determined at a cycle corresponding to said delay time (τ).

21. A system according to claim 20, further including:

storing means for storing said fuel injection correction coefficients (KEGRN) consecutively; and said fuel injection correction coefficient determining means select one from among said stored coefficients that is estimated at a cycle corresponding to said delay time (τ).

22. A system according to claim 14, wherein said first and second flow rate estimating means estimates said first and second flow rates (QACT, QCMD) based on a ratio between an upstream pressure and a downstream pressure acting on said valve and valve lifting amount (LACT, LCMD).

23. A system according to claim 22, wherein said first and second flow rate estimating means estimates said first and second flow rates (QACT, QCMD) based on a ratio (PBA/PA) between pressure (PBA) in said intake pipe and atmospheric pressure (PA) and valve lifting amount (LACT, LCMD).

24. A system according to claim 22 further including:

direct ratio determining means for determining a direct ratio (EA) indicative of a ratio of an amount of exhaust gas that enters said combustion chamber during a period (n) to a whole amount of exhaust gasses (gt(n)) passing through said valve during said period (n);

carry-off ratio determining means for determining a carry-off ratio (EB) indicative of exhaust gas that enters said combustion chamber during said period (n) to exhaust gases (gc(n-m)) that passed said valve by a time (m) period earlier and that remain in a space before said combustion chamber;

exhaust gas amount determining means for determining a whole amount of exhaust gas (gin) that enters said combustion chamber during said period (n) based on said direct ration (EA) and said carry-off ratio (EB); and said fuel injection correction coefficient determining means determines said fuel injection correction coefficient (KEGRN) based on said estimated net exhaust gas recirculation rate and said whole amount of exhaust gas (gin).

25. A system according to claim 14, further including:

delay time determining means for determining a delay time (τ) until exhaust gas that passed through said valve enters said combustion chamber of said engine; and said net exhaust gas recirculating means estimates said net rate of exhaust gas recirculated at each predetermined cycle consecutively and selects one among said net rates that is estimated at a cycle corresponding to said delay time (τ).

26. A system according to claim 25, further including:

storing means for storing said net rates consecutively; and said net exhaust gas recirculating means select one from among said stored net rates that is estimated at a cycle corresponding to said delay time (τ).

27. A system according to claim 25, wherein said delay time (τ) is determined based on said operating conditions of said engine.

28. A system according to claim 25, wherein said delay time (τ) is a fixed value.

* * * * *